US008099555B2

(12) United States Patent
Williamson

(10) Patent No.: US 8,099,555 B2
(45) Date of Patent: Jan. 17, 2012

(54) SYSTEMS AND METHODS FOR MEMORY MANAGEMENT ON PRINT DEVICES

(75) Inventor: Christopher Williamson, Louisville, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 548 days.

(21) Appl. No.: 12/358,816

(22) Filed: Jan. 23, 2009

(65) Prior Publication Data
US 2010/0191912 A1    Jul. 29, 2010

(51) Int. Cl.
G06F 12/00    (2006.01)
G06F 13/00    (2006.01)
G06F 13/28    (2006.01)

(52) U.S. Cl. .................. 711/118; 711/133; 711/E12.02; 711/E12.041

(58) Field of Classification Search ............................ None
See application file for complete search history.

(56) References Cited

U.S. PATENT DOCUMENTS

| | | | | |
|---|---|---|---|---|
| 4,525,780 A * | 6/1985 | Bratt et al. | ..................... | 711/163 |
| 4,630,198 A * | 12/1986 | I-Yuan | .......................... | 711/118 |
| 5,592,594 A * | 1/1997 | Cahoon | ......................... | 358/1.16 |
| 5,822,505 A * | 10/1998 | Okada | .......................... | 358/1.14 |
| 5,822,749 A * | 10/1998 | Agarwal | ................................ | 1/1 |
| 6,507,898 B1 * | 1/2003 | Gibson et al. | ................. | 711/168 |
| 7,265,866 B2 * | 9/2007 | Holmstead et al. | .......... | 358/1.16 |
| 7,957,016 B2 * | 6/2011 | Moss et al. | ..................... | 358/1.15 |
| 2003/0023815 A1 * | 1/2003 | Yoneyama et al. | ........... | 711/133 |
| 2005/0285871 A1 * | 12/2005 | Tsujiguchi | ..................... | 345/565 |
| 2010/0013845 A1 * | 1/2010 | Yamamoto | ..................... | 345/557 |
| 2010/0118323 A1 * | 5/2010 | Horikawa | ..................... | 358/1.11 |
| 2010/0238177 A1 * | 9/2010 | Igarashi | ........................ | 345/441 |

* cited by examiner

*Primary Examiner* — Pierre-Michel Bataille
*Assistant Examiner* — Matthew Chrzanowski
(74) *Attorney, Agent, or Firm* — Finnegan, Henderson, Farabow, Garrett & Dunner, L.L.P.

(57) ABSTRACT

Systems and methods disclosed permit flexible optimization of printer cache memories by specify criteria for determining cache membership for objects derived from a print data streams, wherein the objects may be associated with distinct reference counts. In some embodiments, the method may comprise the steps of: assigning an initial value to the reference count associated with an object, if the object is not present in the cache; incrementing the reference count by a first weight, if the object is already present in the cache; decrementing the reference count by a second weight, in response to an end-of-page event; and removing the object from the cache if the reference count is below a threshold.

20 Claims, 3 Drawing Sheets

SYSTEMS AND METHODS FOR MEMORY MANAGEMENT ON PRINT DEVICES

BACKGROUND

1. Field of the Invention

The present invention relates to the field of printing and in particular, to systems and methods for managing memory on print devices.

2. Description of Related Art

In order to facilitate faster printing of images and/or other objects that are re-used in a document being printed, such objects may be cached in a cache memory. When cached objects are referenced by other (cached and non-cached) objects, the referenced object may be quickly accessed for further processing. Optimally managing cache memory utilization permits quicker access to referenced objects, while ensuring that memory and other resources consumed by unused objects are freed in a timely manner.

One mechanism to manage cached objects in computer systems is termed reference counting. In reference counting, the number of external references ("the reference count") to a resource such as a cached object may be determined and the reference count may be associated with the resource or object. When the reference count indicates that an object is no longer referenced, the object or resource may be removed from the cache. Typically, deallocation occurs when the reference count falls to zero indicating that the object is not referenced by any other object, effectively rendering the object inaccessible. In traditional methods of reference counting, the reference count is incremented by one when the object or resource is newly referenced and is decremented by one when an existing reference to the object or resource is destroyed or overwritten.

However, in printing environments, where memory size, memory speeds, cache size, processor speed, and other system parameters can vary greatly between printers, such traditional mechanisms limit cache management flexibility. Therefore, there is a need for systems and methods for memory management on printing devices that afford greater flexibility in cache optimization techniques.

SUMMARY

Consistent with embodiments disclosed herein, systems and methods for determining cache membership for at least one object, wherein the cache forms part of the memory of a printer and the object is associated with at least one reference count are disclosed. In some embodiments, the method may comprise the steps of: assigning an initial value to the reference count, if the object is not present in the cache; incrementing the reference count by a first weight, if the object is already present in the cache; decrementing the reference count by a second weight, in response to an end-of-page event; and removing the object from the cache if the reference count is below a threshold.

Embodiments also relate to software, firmware, and program instructions created, stored, accessed, or modified by processors using computer-readable media or computer-readable memory. The methods described may be performed on a computer and/or a printing device.

These and other embodiments are further explained below with respect to the following figures.

DETAILED DESCRIPTION

In accordance with embodiments disclosed herein, systems and methods for memory management on print devices are presented. The memory management techniques including optimization techniques that permit greater flexibility in managing objects in the cache memory of printing devices. Objects may include image, graphic, text, font, vector metadata objects, as well as any other objects that may be cached.

Vector metadata, which can include figures and shapes, often describes content in terms of various mathematical parameters. For example, mathematical parameters may describe color, shape, and/or texture data. Additional examples of vector metadata include objects such as Adobe Illustrator™ line art drawings, charts, as well as shapes like boxes, circles, etc. Vector metadata can also include XML-based Scalable Vector Graphics ("SVG") objects, which can describe two-dimensional static and dynamic (interactive or animated) objects. SVG objects can be grouped, styled, transformed, and composited into previously rendered objects. Caching may help facilitate access to SVG and other vector metadata objects.

Figure 1:
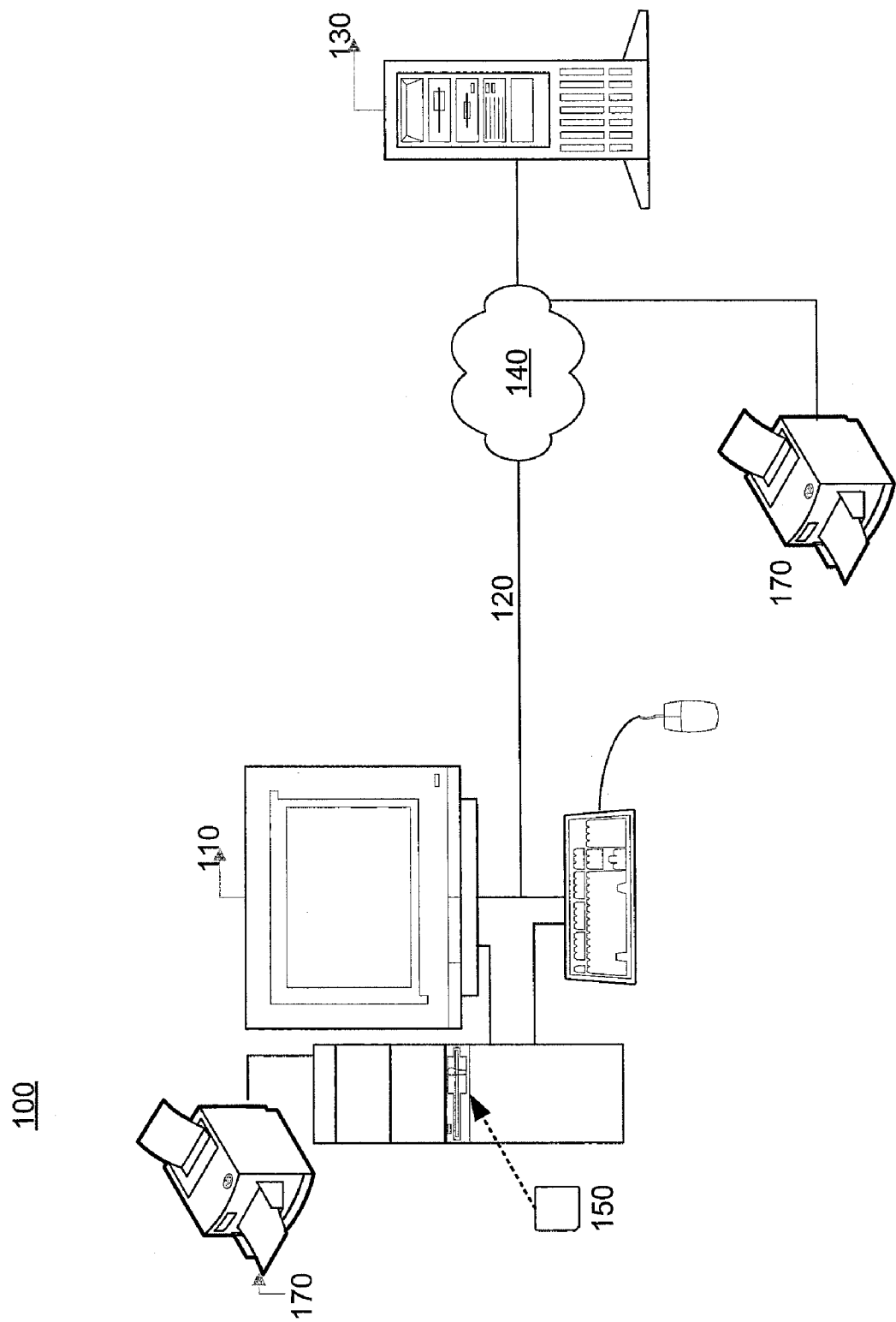
FIG. 1 shows a block diagram illustrating components in an exemplary system for processing print data streams with image and soft mask data.

FIG. 1 shows a block diagram illustrating components in an exemplary system for printing documents. An application for determining the cache membership of objects derived from a print data stream may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL") such as Adobe™ PDF, and variants thereof. Printer 170 may receive a print data stream corresponding to a PDL description of a document, which provides a high-level description of each page in a document. This PDL description is often translated to a series of lower-level printer-specific commands when the document is being printed. A variety of objects, including images, text, graphics, font, vector metadata and/or other objects may be derived from the print data stream, stored in printer memory, and may be re-used at various points during the course of the document printing process.

The translation process from PDL to lower-level printer-specific commands may be complex and depend on the features and capabilities offered by exemplary printer 170. For example, printer 170 may process its data in stages. In a first stage, printer 170 may parse PDL commands and break down high-level instructions into a set of lower level instructions called primitives. These primitives may be fed to a subsequent stage in exemplary printer 170, which may use them to determine where to place marks on a page. In some instances, each primitive may be processed as it is generated. In other systems, a large set of primitives may be generated, stored, and then processed. For example, the primitives needed to describe a single page may be generated, stored in a list, and then processed. A set of stored primitives is termed an intermediate list or a display list.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphic, image, font, vector metadata and other objects can be distributed. Thus, computing device 110, server 130, and/or the printer may perform portions of document print processing, display list generation, half-toning, color matching, and/or other manipulation processes before a document is physically printed by printer 170. In some embodiments, printer 170 may have an operating system, which may include techniques for determining the cache membership of objects derived from the print data stream in a manner consistent with disclosed embodiments.

Computing device 110 may also contain removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection.

Network 140 could include a Local Area Network (LAN), a Wide Area Network (WAN), or the Internet. Printer 170 may be connected to network 140 through connection 120. Exemplary printer 170 may also be connected directly to computing device 110 and/or server 130. System 100 may also include other peripheral devices (not shown). An application for determining the cache membership of objects derived from a print data stream may be deployed on one or more of the exemplary computers or printers, as shown in FIG. 1. For example, computing device 110 could execute software that may be downloaded directly from server 130, and portions of the application may also be executed by exemplary printer 170.

Figure 2:
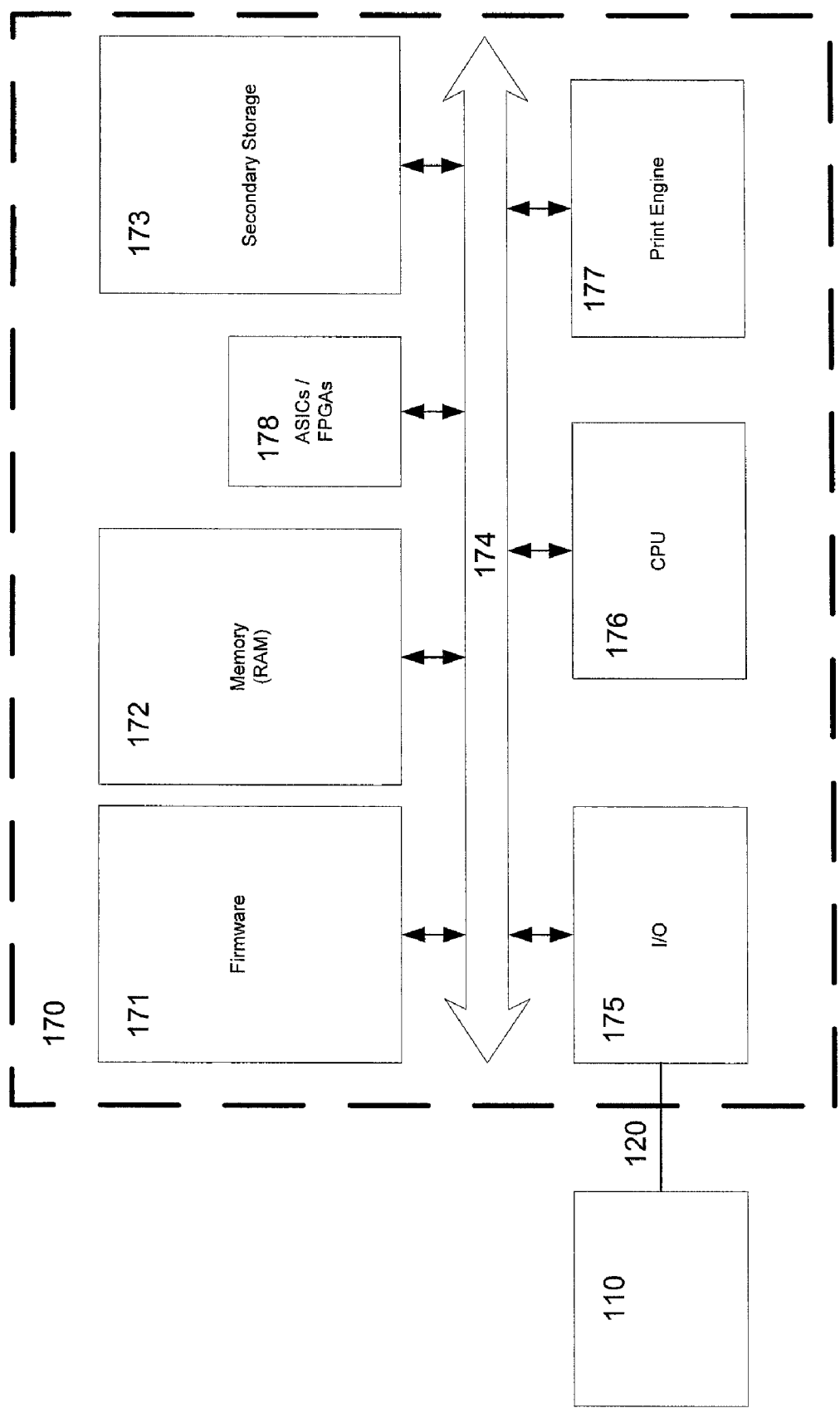
FIG. 2 shows a high level block diagram of an exemplary printer.

FIG. 2 shows a high-level block diagram of exemplary printer 170 coupled to a computing device 110 over connection 120. Exemplary printer 170 may contain bus 174 that couples CPU 176, firmware 171, memory 172, input-output ports 175, print engine 177, and secondary storage device 173. Exemplary printer 170 may also contain other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. Printer 170 may receive a print data stream using I/O ports 175 and connection 120. Various objects including images, text, graphics, font, vector metadata and/or other objects may be derived from the print data stream, stored in printer memory, and may be re-used at various points during the course of the document printing process.

In some embodiments, printer 170 may also be capable of executing software including image extraction and processing software, data compression and decompression, a printer operating system and other appropriate application software. In some embodiments, the operating system may include, or may be capable of invoking, routines that perform memory management in a manner consistent with disclosed embodiments.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Memory 172 may include a cache memory that can store recently and/or frequently accessed objects. In some embodiments, cache memory may be implemented as a separate high speed memory that can permit faster access to stored objects. In some embodiments, the cache memory may form part of the memory hierarchy of printer 170. However, because the cache memory is typically more expensive it may form a fraction of memory 172. Accordingly, memory management routines on printer 172 may include cache optimization techniques for determining the cache membership of objects derived from a print data stream received by printer 170.

Firmware 171 may hold instructions and data including but not limited to a boot-up sequence, pre-defined routines including routines for memory management, blending, compositing, image processing, trapping, document processing, and other code. In some embodiments, code and data in firmware 171 may be copied to memory 172 prior to being acted upon by CPU 176. Routines in firmware 171 may also include code to translate page descriptions received from computing device 110 to display lists. In some embodiments, firmware 171 may include rasterization routines to convert display commands in a display list to an appropriate rasterized bit map and store the bit map in memory 172. Firmware 171 may also include compression and memory management routines. Data and instructions in firmware 171 may be upgradeable using one or more of computer 110, server 130, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of translation, compression, decompression, compositing, and rasterization algorithms.

Exemplary computing device 110 may transform document data into a first printable data. In some embodiments, the first printable data may correspond to a PDL description of a document. Then, the first printable data can be sent to printer 170 for transformation into intermediate printable data. In some embodiments, the translation process from a PDL description of a document to the final printable data comprising of a series of lower-level printer-specific commands may include the generation of intermediate printable data comprising of display lists of objects. Display lists may hold a variety of objects and one or more types of data objects in a display list may correspond to an object in a user document.

Display lists, which may aid in the generation of final printable data, may be stored in memory 172 or secondary storage 173. Exemplary secondary storage 173 may be an internal or external hard disk, memory stick, or any other memory storage device capable of being used by system 200. In some embodiments, the display list may reside and be transferred between one or more of printer 170, computing device 110, and server 130 depending on where the document processing occurs.

Memory to store display lists may be a dedicated memory or form part of general purpose memory 172, or some combination thereof. In some embodiments, memory 172, which may comprise a cache memory, may be dynamically allocated, managed, and released as needed. Printer 170 may transform intermediate printable data into a final form of printable data and print according to this final form.

Figure 3:
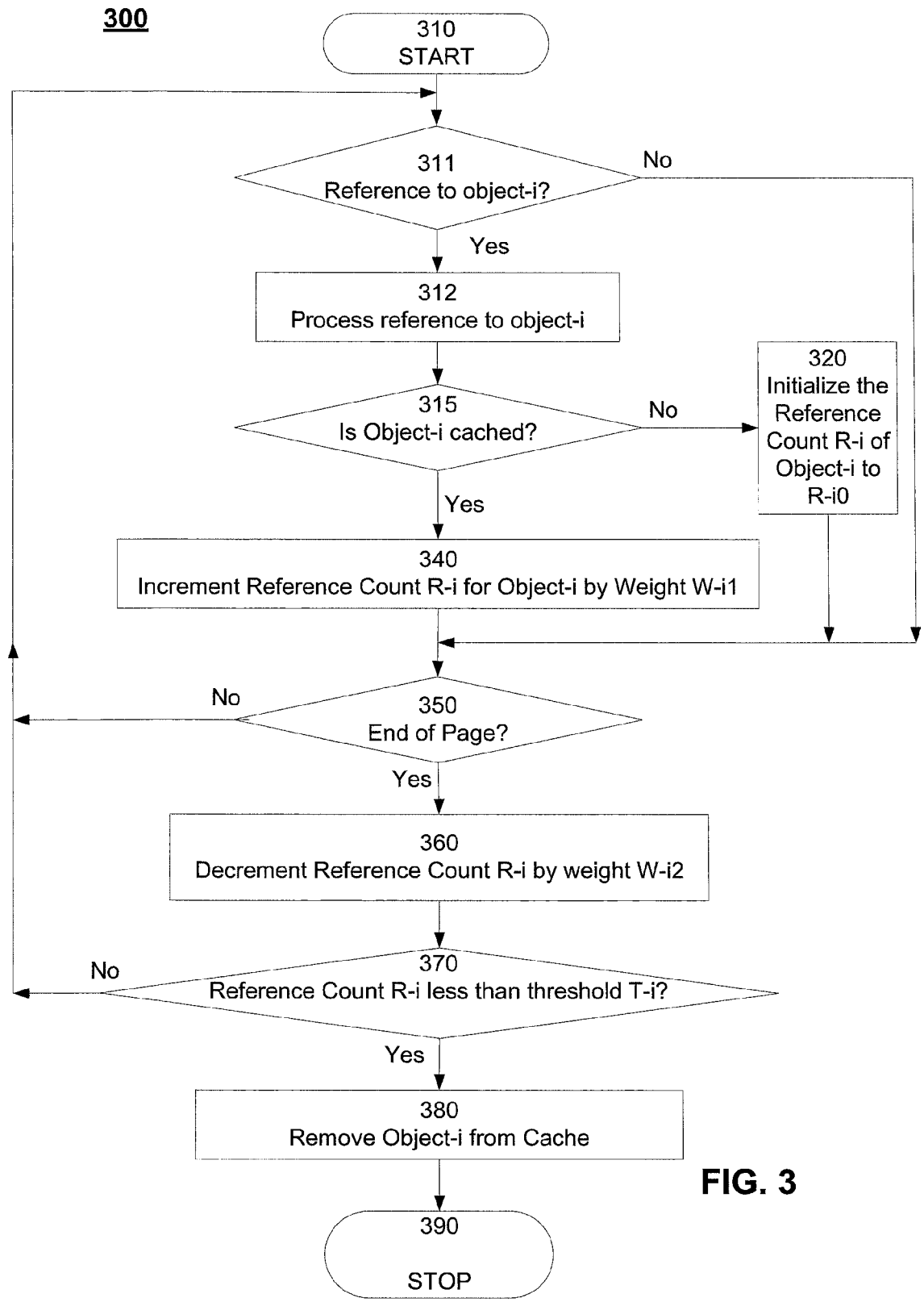
FIG. 3 shows a flowchart illustrating steps in an exemplary algorithm for memory management for an exemplary object, a candidate for potential caching.

FIG. 3 shows a flowchart illustrating steps in an exemplary algorithm 300 for memory management for exemplary object-i. In some embodiments, object-i may be derived by processing a print data stream received by printer 170. In some embodiments, the method illustrated for object-i may also be applied to other objects in the print data stream with appropriate modifications as would be apparent to one of ordinary skill in the art. Objects may include text, graphic, image, font, vector metadata and other objects, which may be encountered during the printing process. In some embodiments, algorithm 300 may be invoked by memory management routines in printer 170, which may be part of the printer operating system. In some embodiments, algorithm 300 may employ a modified reference counting technique consistent with embodiments disclosed herein. In some embodiments, a distinct reference count may be associated with each object. In some embodiments, a reference count and methods to increment and decrement the reference count may be part of the object. In some embodiments, a distinct reference count may be created and associated with each object.

In some embodiments, algorithm 300 may commence in step 310, and in step 311, the algorithm checks for a reference to object-i in cache memory. If a reference to object-i occurs ("Yes" in step 311), then in step 312, a reference to object-i may be processed. If no reference occurs to object-i ("No" in step 311), then the algorithm will set an initial weighting and proceeds to step 350.

In step 315, referenced object-i can be checked to see if it is already present in the cache. If object-i is not present in the cache ("No" in step 315) then, in step 320, reference count R-i associated with object-i may be initialized to value R-i0. Exemplary object-i may be an object that is being cached for the first time, or an object that has been removed from the cache previously and is now being reintroduced.

If object-i is detected in the cache ("Yes" in step 315), which indicates that the object is being re-used then the algorithm can proceed to step 340. In step 340, the reference count R-i associated with object-i may be incremented by weight W-i1. Weight W-i1 may be viewed as a bias in favor of retaining the object in the cache. In some embodiments, weight Wi-1 may be associated with a single object. In some embodiments, weight W-i1 may be associated with a class of objects. For example, a weight may be assigned to all text objects, another weight to graphics objects and a third to image objects. In some embodiments, weight Wi-1 may be common to all objects. In some embodiments, objects may be classified based on their absolute size, or their size relative to the size of cache on printer 170.

Next, in step 350, the algorithm checks for an end-of-page event. If an end-of-page event has occurred ("Yes" in step 350), then reference count R-i may be decremented by weight W-i2. Weight W-i2 may be viewed as a bias in favor of removing the object from the cache. In some embodiments, weight Wi-2 may be associated with a single object. In some embodiments, weight W-i2 may be associated with a class of objects. For example, a weight may be assigned to objects that exceed some predetermined size. In some embodiments, weight Wi-2 may be common to all objects. Weights Wi-1 and Wi-2 may be set to different values based on the configuration of printer 170, object classifications, system parameters, and/or directives in the PDL used for the print job being processed by printer 170. If the end-of-page event has not occurred ("No" in step 350) then the algorithm returns to step 312, where it awaits processing of the next reference to object-i.

In step 370, the current value of reference count R-i for object-i is compared to a threshold T-i. In some embodiments, the value of T-i may be limited to a value less than (R-i0−W-i2). If R-i≧T-i ("Yes" in step 370) then object-i may be retained in the cache, and the algorithm returns step 312, where it awaits processing of the next reference to object-i. If R-i<T-i then object-i may be removed from the cache in step 380. In some embodiments, threshold T-i may be associated with a single object. In some embodiments, threshold T-i may be associated with a class of objects. In some embodiments, threshold T-i may be common to all objects. In some embodiments, the initial value of reference count R-i0 for object-i may be set to a value not less than the sum of W-i2 and T-i to ensure that object-i will be cached for at least one page.

In one embodiment, objects may be classified based on the size of the object so that weights (W-i1 and/or W-i2) may be assigned based on object size. For example, large objects, which occupy more cache space, may be assigned weights to increase the probability of their removal. In one embodiment, the difference (W-i1−W-i2) may be lowered, and/or a higher threshold T-i may be set for objects that exceed either a predetermined size or some predetermined ratio of object size relative to cache size. In some embodiments, the value of W-i1 may be set to a value not less than W-i2. As an illustration, in a system that favors object retention, W-i1 may be set to a high value, W-i2 to a lower value i.e. W-i1≧W-i2. Further, threshold T-i may be set to a low value, which may be 0, or even a negative number. Although weights Wi-1 and Wi-2, and threshold T-i have been described using simple addition and subtraction, various other complementary mathematical functions may be also be used with appropriate modifications.

For example, the initial value for R-i0 may be set to 8, weights Wi-1 and W-i2 may be set to 10 and 3, respectively, and, threshold T-i may be set to 4. In the above example, an object will be removed from the cache after two end-of-page events following the object's introduction into the cache, if there have been no interim references to the object. At the end of the first page, the value of R-i will be R-i0−W-i2=10−3=7, which is not less than 4 (the value of threshold T-i), therefore object-i will be retained in the cache. At the end of the second page (assuming that there have been no references to object-i) the new value of R-i will be R-i−W-i2=7−3=4, which is not less than the value of T-i, therefore the object will remain in the cache. However, at the end of the third page, (assuming that there have been no references to object-i) the new value of R-i will be R-i−W-i2=4−3=1, which is less than the value of T-i, therefore the object will be removed from the cache. Every reference to the object adds Wi-1 to the current value of R-i and therefore increases the likelihood of its retention.

In general, the weights Wi-1, Wi-2, and threshold T-i may be adjusted based on system parameters, including the absolute size of objects, the size of objects relative to cache size, nature of the print job, the size of the cache, the speed of the printer etc. For example, if printer 170 has a relatively small cache, then the weights and threshold may be adjusted to favor quicker object removal.

Although, for simplicity and ease of explanation, algorithm 300 has been described for an exemplary object-i, each referenced object may be processed in a similar manner with appropriate modifications as would apparent to one of ordinary skill in the art. In some embodiments, if the cache is full and no object has been selected for removal, then the object with the lowest reference count may be selected for removal prior to the introduction of a new object.

In some embodiments, a program for conducting the process described in algorithm 300 can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A computer-implemented method to determine cache membership for at least one object, wherein a cache forms part of a memory of a printer and the at least one object is associated with at least one reference count, the method comprising computer-implemented steps of:
assigning an initial value to the at least one reference count, if the at least one object is not present in the cache;
incrementing the at least one reference count by a first weight, if the at least one object is already present in the cache;
decrementing the at least one reference count by a second weight, in response to an end-of-page event; and
removing the at least one object from the cache if the at least one reference count is below a threshold.

2. The computer-implemented method of claim 1, wherein the initial value is assigned to the at least one reference count prior to placing the at least one object in the cache.

3. The computer-implemented method of claim 1, wherein the initial value assigned to the at least one reference count is not less than a sum of the threshold and the second weight.

4. The computer-implemented method of claim 1, wherein the at least one object is one of:
an image object;
a graphic object;
a text object;
a font object; or
a vector metadata object.

5. The computer-implemented method of claim 1, wherein the first weight is common to a class of objects.

6. The computer-implemented method of claim 1, wherein the first weight is common across all objects.

7. The computer-implemented method of claim 1, wherein the second weight is common to a class of objects.

8. The computer-implemented method of claim 1, wherein the second weight is common across of objects.

9. The computer-implemented method of claim 1, wherein the method is performed on a processor coupled to the printer.

10. The computer-implemented method of claim 1, wherein the first and second weights are determined based on at least one of: size of the at least one object and size of the cache.

11. The computer-implemented method of claim 1 wherein the first weight is not less than the second weight.

12. A computer-readable medium that stores instructions, which when executed by a processor perform steps in a computer-implemented method for determining cache membership for at least one object, wherein a cache forms part of a memory of a printer and the at least one object is associated with at least one reference count, the method comprising the computer-implemented steps of:
assigning an initial value to the at least one reference count, if the at least one object is not present in the cache;
incrementing the at least one reference count by a first weight, if the at least one object is already present in the cache;
decrementing the at least one reference count by a second weight, in response to an end-of-page event; and
removing the at least one object from the cache if the at least one reference count is below a threshold.

13. The computer-readable medium of claim 12, wherein the initial value assigned to the at least one reference count is not less than a sum of the threshold and the second weight.

14. The computer-readable medium of claim 12, wherein the at least one object is one of:
an image object;
a graphic object;
a text object;
a font object; or
a vector metadata object.

15. The computer-readable medium of claim 12, wherein the first and second weights are determined based on at least one of: size of the at least one object and size of the cache.

16. The computer-implemented method of claim 12 wherein the first weight is not less than the second weight.

17. A system for determining cache membership for at least one object derived from a print data stream, wherein the at least one object is associated with at least one reference count, the system comprising:
an input interface configured to receive the print data stream;
a memory, comprising a cache, configured to store the at least one object derived from the print data stream; and
a processor coupled to the input interface and the memory, wherein the processor is configured to execute instructions in the memory to perform the steps of:
assigning an initial value to the at least one reference count, if the at least one object is not present in the cache;
incrementing the at least one reference count by a first weight, if the at least one object is already present in the cache;

decrementing the at least one reference count by a second weight, in response to an end-of-page event; and
removing the at least one object from the cache if the at least one reference count is below a threshold.

18. The system of claim 17, wherein the initial value assigned to the at least one reference count is not less than a sum of the threshold and the second weight.

19. The system of claim 17, wherein the first and second weights are determined based on at least one of object size and cache size.

20. The system of claim 17, wherein the first weight is not less than the second weight.

* * * * *